3 Sheets—Sheet 1.
N. JENKINS.
Machinery for Dressing or Shaping Wood, Stone, &c.
No. 238,292. Patented March 1, 1881.
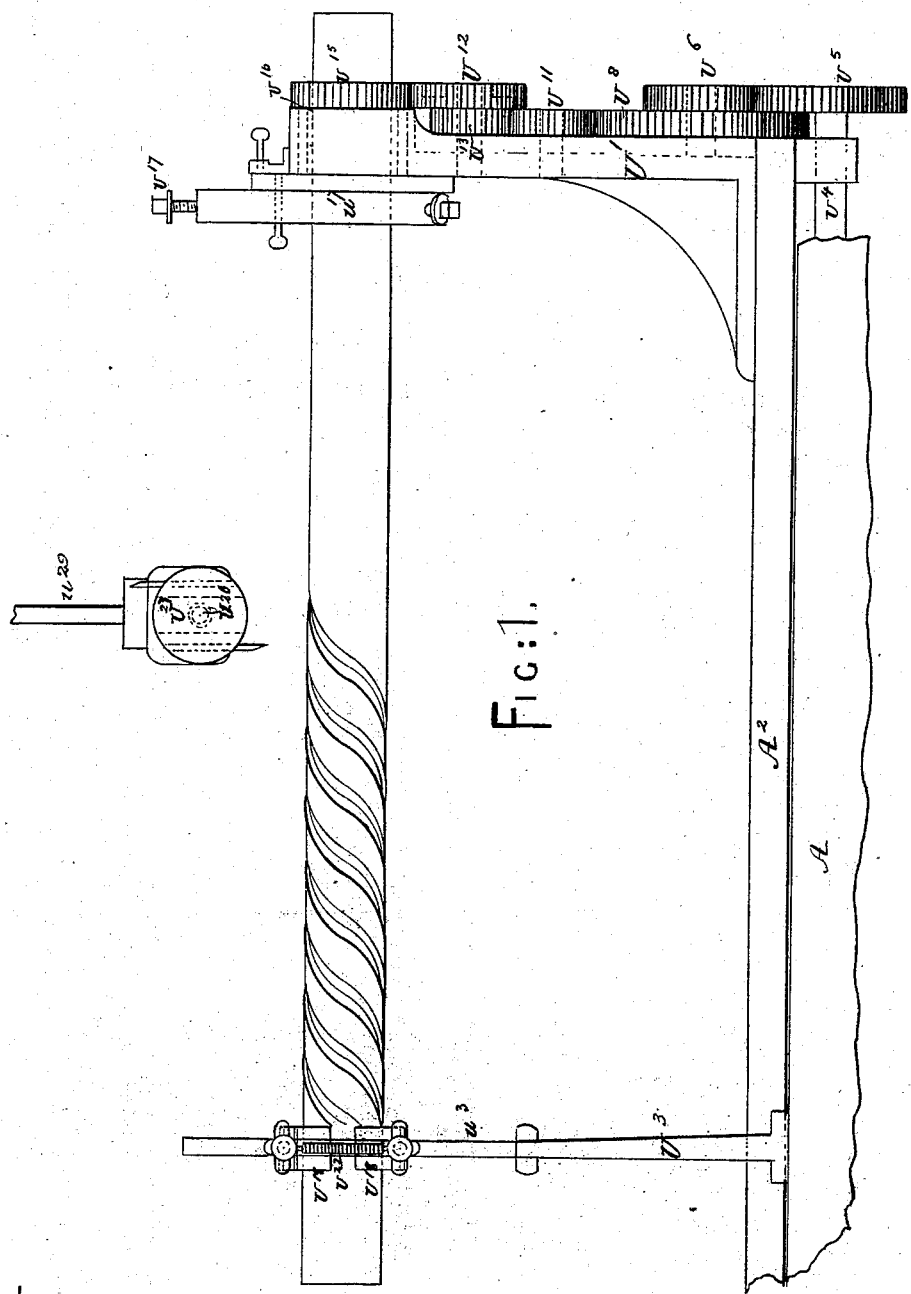

3 Sheets—Sheet 2.

N. JENKINS.
Machinery for Dressing or Shaping Wood, Stone, &c.

No. 238,292. Patented March 1, 1881.

WITNESSES:
W. C. Brookes
Chas. C. Stetson

INVENTOR:
Nicholas Jenkins
by his attorney T. S. Stetson
New York

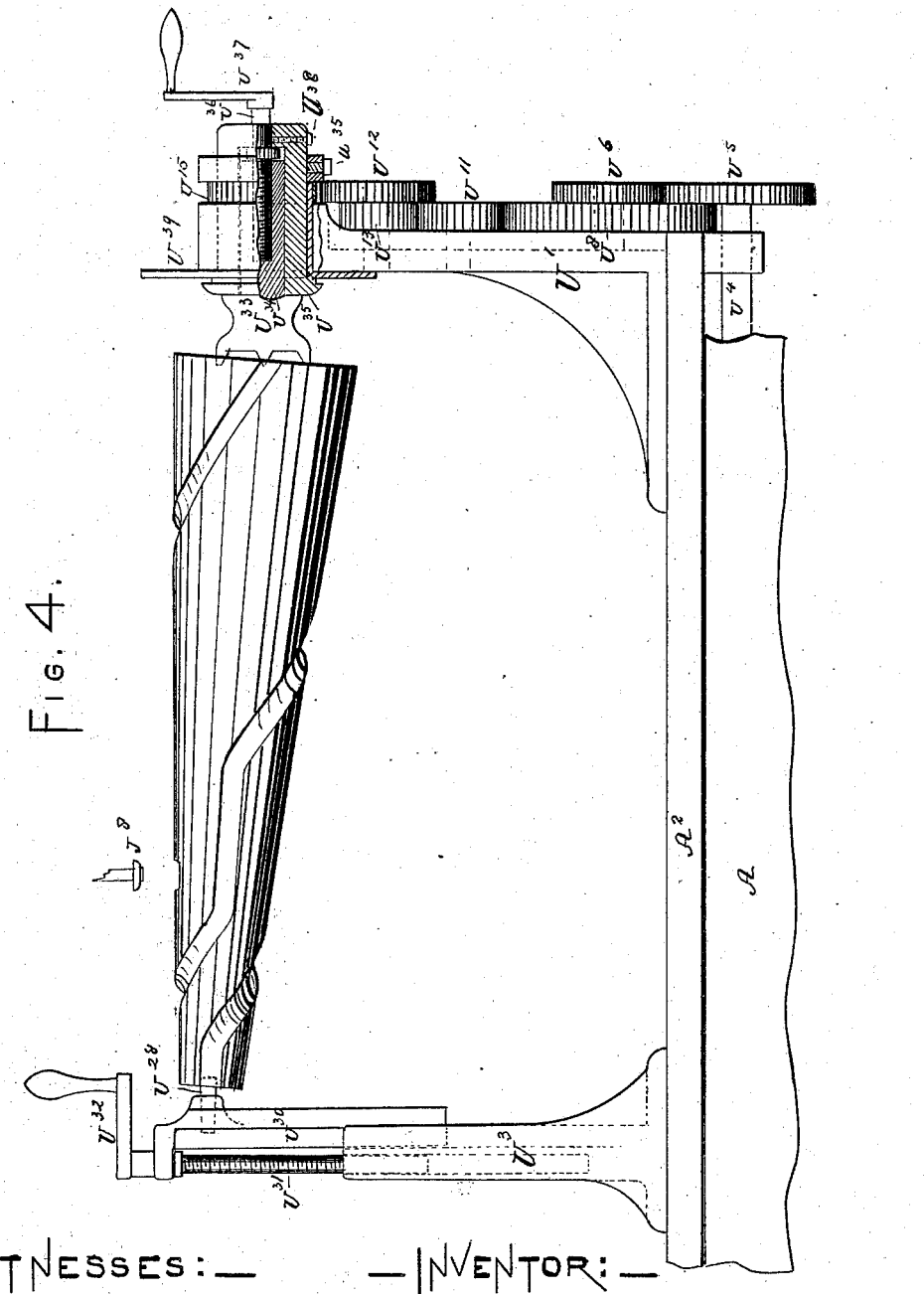

UNITED STATES PATENT OFFICE.

NICHOLAS JENKINS, OF NEW HAVEN, CONNECTICUT.

MACHINERY FOR DRESSING OR SHAPING WOOD, STONE, &c.

SPECIFICATION forming part of Letters Patent No. 238,292, dated March 1, 1881.

Application filed January 6, 1879.

*To all whom it may concern:*

Be it known that I, NICHOLAS JENKINS, of the city and county of New Haven, in the State of Connecticut, have invented certain new and useful Improvements relating to Machinery for Dressing or Shaping Wood, Stone, or other Analogous Material; and I do hereby declare that the following is a full, clear, and exact description thereof.

This invention relates to mechanism particularly applicable for producing spiral flutings or rope-moldings, presenting the appearance of a rope or twisted column.

I feed forward the material, either of uniform diameter or tapering, giving it the proper revolving motion, and act on it to produce the required spiral grooves by revolving cutters. When working in wood I produce the spiral grooves by cutters revolving in opposite directions, with the advantage that the cutters may operate in the direction of the grain. These cutters excavate the proper sharp-bottomed grooves, and are both mounted on a frame which is conveniently adjustable to adapt the cutters to quick or slow spirals, with corresponding change of feed. I provide means also for alternating the spirals with straight cuts or flutes.

The following is a description of what I consider the best means of carrying out the invention.

The accompanying drawings form part of this specification.

Figure 3:
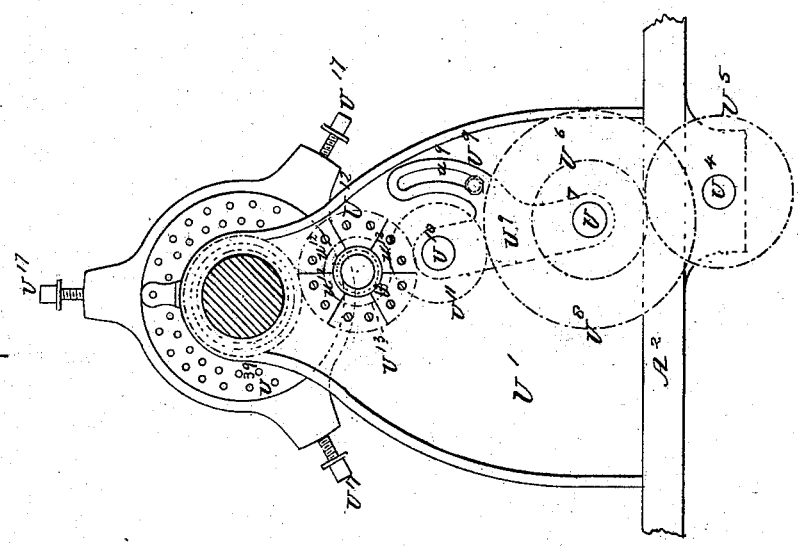
Figure 2:
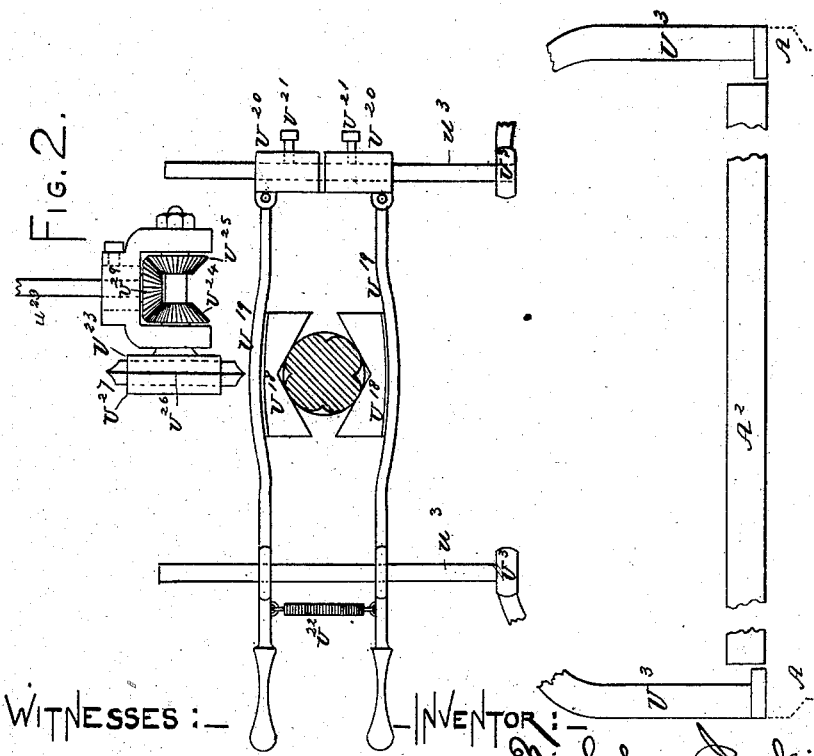

Figure 1 represents a side view, Fig. 2 a cross-section, and Fig. 3 an end view, of apparatus constructed according to my invention. Fig. 4 is a view, in perspective, showing the adjustment of the centering device.

In each of the views similar letters of reference are employed to indicate corresponding parts wherever they occur.

$U'$ is an upright fixed on a suitable table or carriage, $A^2$, and $U^3$ is a stand mounted on the fixed frame-work A and adapted to support one end of the molding. The upright $U'$ supports a series of gear-wheels, which are slowly turned by a shaft, $U^4$, which extends lengthwise under the carriage $A^2$, and is rotated continuously by any suitable machinery. The upper gear-wheel, $U^{15}$, is affixed on a hollow sleeve, $U^{16}$, which receives the end of the piece of material to be operated upon through it and holds it by clamping-screws $U^{17}$, acting in suitable shoes (not represented) in a chuck, $u^{17}$, mounted on its forward end.

$U^{18}$ are clamps for holding the work, and they are held in levers $U^{19}$ pivoted to blocks $U^{20}$, which are adjustable up and down on the vertical standards $u^3$ of the frame by the aid of pinching-screws $U^{21}$, and are compressed together by the spring $U^{22}$.

It will be understood that the carriage $A^2$ is moved slowly while the work is progressing. The "pitch" of the rope-molding, or of the screw-thread produced thereon by the cutters, depends on the relation of these motions, the rotary and the longitudinal.

The shaft $U^4$ communicates the motion to the hollow sleeve $U^{16}$ through a train of wheels, $U^5$ $U^6$ $U^8$ $U^{11}$ $U^{12}$ $U^{13}$ $U^{15}$, the wheel $U^{12}$ of which is formed with removable segments $u^{12}$. The segments $u^{12}$ are geared to engage with the toothed surface on the exterior of the wheel $U^{15}$ on the sleeve $U^{16}$, while another wheel, $U^{13}$, fixed to it alongside, is toothed quite around in one solid piece, and gears into the wheel $U^{11}$, which receives motion from the wheel $U^8$, affixed to the wheel $U^6$, which is driven by the wheel $U^5$ on the shaft $U^4$. If one of the segments $u^{12}$ of the wheel $U^{12}$ is removed, the wheel $U^{12}$ will continue to rotate; but it will, in that part of its periphery where the toothed sector is removed, impart no rotation to the work. It follows that by removing and replacing the geared segments in the wheel $U^{12}$ the work may be dressed or finished with spiral grooves alternating with longitudinal grooves. This affords facilities for additional varieties in decoration.

Grooves may be executed in the work by a cutter of any ordinary form carried by the spindle above. In Figs. 1 and 2 I have shown two cutter-wheels of proper section revolved in opposite directions. These cutter-wheels are revolved rapidly, being held in the proper plane to execute the spiral cuts required.

The cutter-wheel $U^{23}$ is mounted on a sleeve, and receives motion through a gear-wheel, $U^{24}$, in an opposite direction to that which is imparted, through the other gear-wheel, $U^{25}$, to the shaft $U^{26}$, which carries the other cutter-wheel, $U^{27}$, both wheels, $U^{24}$ and $U^{25}$, being driven by a pinion, $U^{29}$, revolving with the supporting-rod $u^{29}$.

It must be taken into account, in arranging for this work, that when a straight groove alternates with a spiral the cutter-wheels $U^{23}$ $U^{27}$ will execute a different-shaped groove from that of the spiral, unless provisions are made for lifting out the cutters and turning them partly around horizontally at each change of motion. In such case a small portion, at the angle where the two kinds of grooves unite, may require to be executed by hand.

Means should be taken to hold the plate which supports the wheels $U^{23}$ $U^{27}$ firmly in the required position, and to allow it to be adjusted around to accommodate the different pitches of different screws, as also to provide, as just described, for alternating between longitudinal scores and spiral scores.

The stand $U^3$ should usually be as near the cutter as it can safely stand without contact. It does not move, but supports the wood, effectually to resist the shaking or deflection induced by the cutters.

Fig. 4 represents my improved apparatus arranged for operating on tapering pieces, in which case I prefer to modify the stand $U^3$, and substitute for the clamps $U^{18}$ a dead-center, $U^{28}$. The stand in this case is affixed, by any suitable clamping means, on the table $A^2$, and the dead-center $U^{28}$ is affixed in the upper end of a slide, $U^{30}$, capable of being raised and lowered in guides in the stand $U^3$ by a screw, $U^{31}$, tapped into the post $U^3$, and operated by the crank-handle $U^{32}$.

The height of the center $U^{28}$ is shown in Fig. 4, so adjusted as to bring the upper surface of the tapering piece being operated upon onto a dead-level. This, however, may be varied when it is required to form grooves of varying diameter, or to operate on straight work. In this case, in place of the material to be operated upon passing through and being supported in the hollow sleeve $U^{16}$, I support it by means of a spur-center, $U^{33}$, which is provided with a shaft, $U^{34}$, adapted to fit into a hollow socket-piece, $U^{35}$, fitting truly on the hollow sleeve $U^{16}$, and with the same when held firmly therein by means of the binding-screw $u^{35}$. This spur-center $U^{33}$ is capable of adjustment backward and forward, so as to hold its block or piece independently of the socket-piece $U^{35}$ and sleeve $U^{16}$, when desired, by loosening the screw $U^{38}$ and turning shaft $U^{36}$ and crank-handle $U^{37}$. By this means I am enabled to set the spur-center $U^{33}$ to hold the block at any desired position to be operated upon by the cutters $J^8$. The shaft $U^{34}$ may be held rigidly in the socket-piece $U^{35}$ and prevented from turning, when desired, by means of a binding-screw, $U^{38}$.

The position of the block may be regulated or gaged by means of a pin-wheel, $U^{39}$, or other suitable means. The operation of the device is in all other respects the same as that described for Figs. 1, 2, and 3. Further description is therefore unnecessary.

The axes $U^7$ $U^{10}$ of the gear-wheels $U^6$ $U^8$ are supported on a pivoted plate, $U^9$, in order to allow of the substitution of wheels of different diameters in place of the wheels $U^6$ $U^8$, in order to vary the speed at which the hollow sleeve $U^{16}$ shall be revolved. This plate is held in position by a locking-bolt working in a segmental slot on an arm, $u^9$, extending from the plate $U^9$.

Other modifications of this apparatus may be made within wide limits, and I can employ cutters of different sizes and shapes and construction to produce any particular effect desired.

If desired, the dead-center $U^{28}$ may be so formed as to be held between the clamps $U^{18}$, in which case the stand $U'$ will be arranged to traverse with the table $A^2$.

This invention is intended more particularly for working wood, and it has been so described; but it may be used for treating marble, slate, and material generally.

I claim as my invention—

1. The carriage $U'$, revolving sleeve $U^{16}$, and stand $U^3$, in combination with suitable cutting means, and with provisions for imparting regulated rotatory and end motion to the material, as herein specified.

2. The carriage $U'$, revolving sleeve $U^{16}$, and adjustable center $U^{28}$, in combination with suitable cutting means, and with provisions for imparting regulated rotary and end motion to the material, as herein specified.

3. The upright $U^{30}$ and screw $U^{31}$, for adjusting the dead-center $U^{28}$ upward and downward, so as to execute tapering work, in combination with the hollow sleeve $U^{16}$ and stand $U^3$, substantially as shown and described.

4. The skip-gear $U^{12}$, provided with removable segments $u^{12}$, adapted to alternate spiral with straight cuts, as herein specified.

In testimony whereof I have hereunto set my hand, this 22d day of June, 1878, in the presence of two subscribing witnesses.

NICHOLAS JENKINS.

Witnesses:
W. COLBORNE BROOKES,
CHAS. C. STETSON.